June 22, 1965 J. SNYDERMAN 3,190,158
TUBE RECUTTER
Filed Feb. 11, 1964 5 Sheets-Sheet 1

INVENTOR.
JOSEPH SNYDERMAN
BY
ATTORNEY

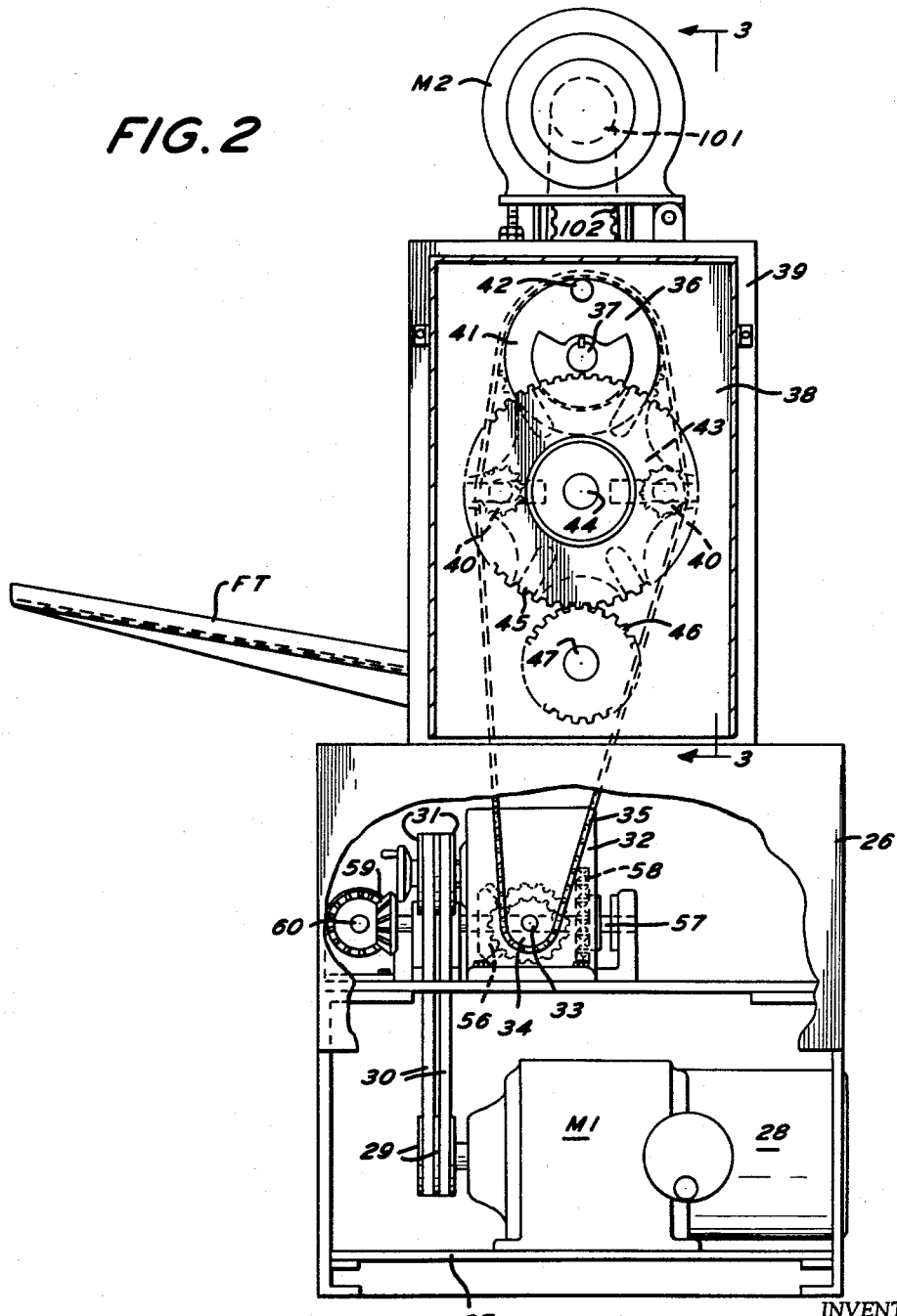

June 22, 1965     J. SNYDERMAN     3,190,158
TUBE RECUTTER
Filed Feb. 11, 1964     5 Sheets-Sheet 3
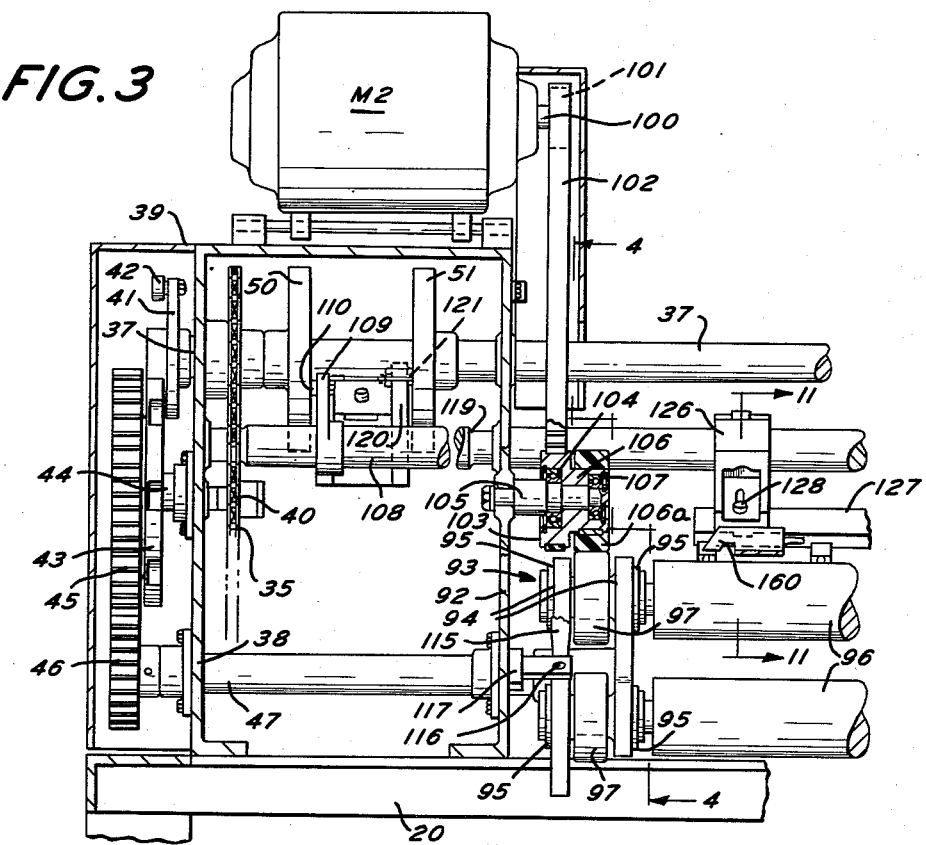
INVENTOR.
JOSEPH SNYDERMAN
BY
ATTORNEY

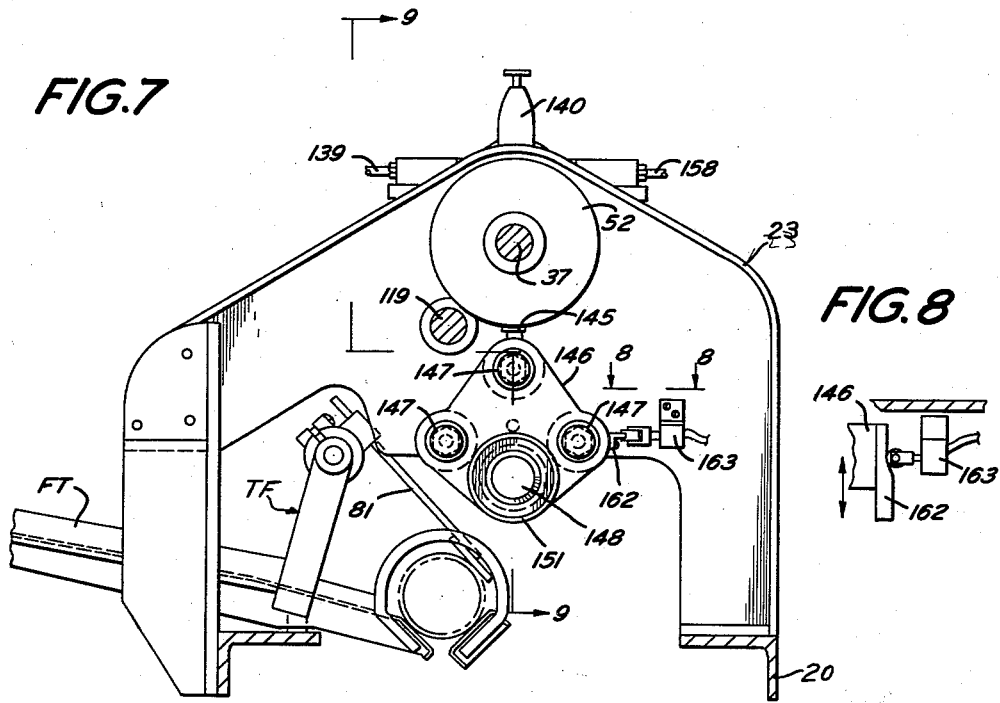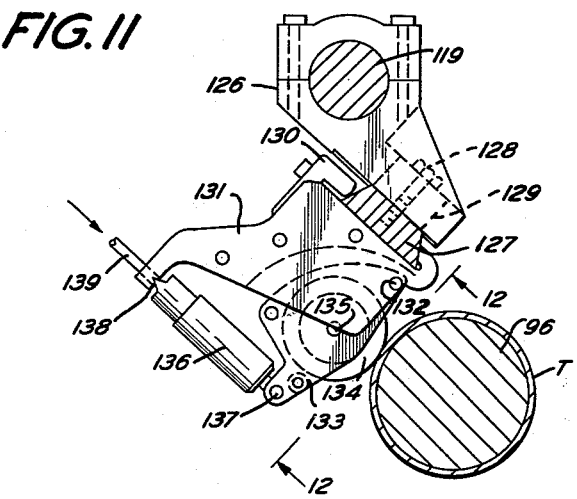

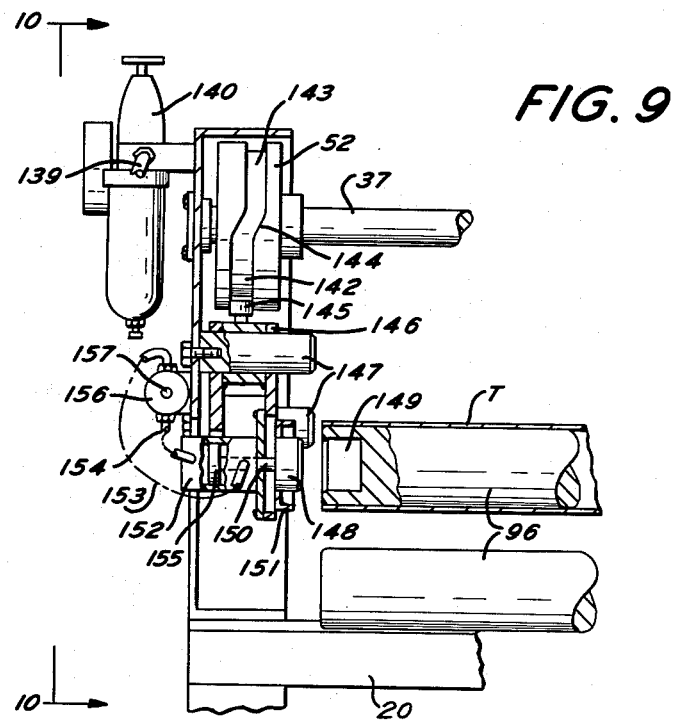
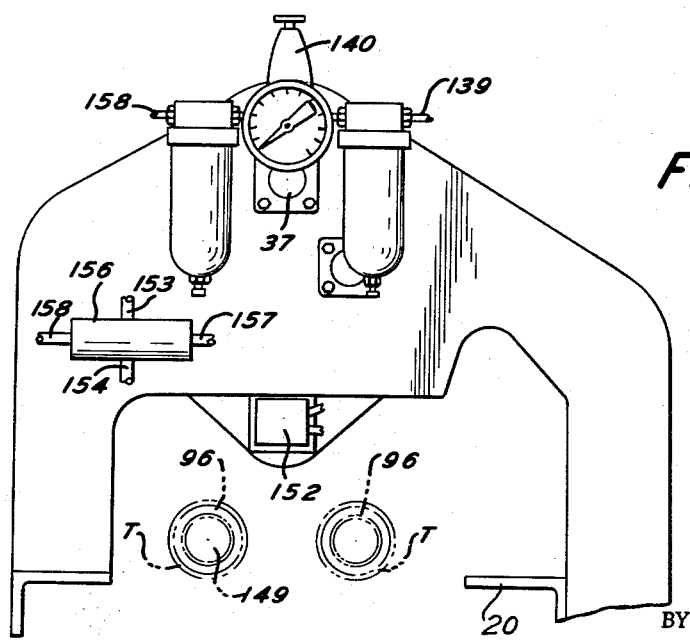

United States Patent Office 3,190,158
Patented June 22, 1965

3,190,158
TUBE RECUTTER
Joseph Snyderman, Philadelphia, Pa., assignor to John Eppler Machine Works, Inc., Philadelphia, Pa., a corporation of Pennsylvania
Filed Feb. 11, 1964, Ser. No. 343,996
19 Claims. (Cl. 82—101)

This invention relates to tube recutter.

It has heretofore been proposed to provide machines for cutting a long tube of paper or the like with a printed exterior surface into a plurality of shorter tubes each of which is to serve as the side wall of a receptacle or container.

Various difficulties have been encountered with the tube recutters heretofore proposed. Among these were difficulties in positioning the tube for cutting so as to have the cuts made at the exact locations desired and slow speed of operation.

It is the principal object of the present invention to provide a tube recutter in which the tube to be cut is advanced onto a cutter mandrel in a simple but effective manner, positioned for cutting, cut, and the severed tubes removed, the operations being expeditiously carried out for high production.

It is a further object of the present invention to provide a tube recutter for severing a length of tube into a plurality of short lengths of tube of predetermined precise length, which has a plurality of tube cutting mandrels to which tubes to be cut are successively supplied, the mandrel on which the cutting is being effected being supported in an improved manner at the end at which supplying of the tube to be cut is effected.

It is a further object of the present invention to provide a tube recutter for registering and then severing a length of tube into a plurality of short lengths of tube of predetermined precise length which has a plurality of tube cutting mandrels to which tubes to be cut are supplied and in which simple but effective driving means is provided for rotating the mandrel on which the cutting is effected.

It is a further object of the present invention to provide a tube recutter having a mandrel for supporting the tube to be cut together with mandrel end supporting and tube positioning structure for registry which is controlled in part by the tube applied for cutting.

It is a further object of the present invention to provide a tube recutter having improved tube positioning which has a cam for approximate positioning and a detector for effecting close and precise positioning of the tube for registry during recutting.

It is a further object of the present invention to provide a tube recutter which has a plurality of mandrels for successively receiving a tube to be recut, advancing to a cutting location, and advancing to a discharge location, the mandrels being carried at one end on a turret head, together with provisions for locking the head against movement for and during cutting.

Other objects and advantageous features of the invention will be apparent from the description and claims.

The nature and characteristic features of the invention will be more readily understood from the following description taken in connection with the accompanying drawings forming part thereof, in which:

FIG. 2 is an end elevational view, enlarged, as seen from the location of the line 2—2 of FIG. 1, parts being broken away to show the details of construction;

FIG. 3 is a fragmentary longitudinal vertical sectional view, taken approximately on the line 3—3 of FIG. 2;

FIG. 4 is a fragmentary trnasverse vertical sectional view taken approximately on the line 4—4 of FIG. 3;

FIG. 5 is a view in elevation of the turret locking cam;

FIG. 6 is a view in elevation of the knife control cam;

FIG. 7 is a fragmentary transverse vertical sectional view, taken approximately on the line 7—7 of FIG. 1;

FIG. 8 is a fragmentary longitudinal horizontal sectional view, taken approximately on the line 8—8 of FIG. 7;

FIG. 9 is a fragmentary longitudinal vertical sectional view taken approximately on the line 9—9 of FIG. 7;

FIG. 10 is a fragmentary transverse vertical sectional view taken approximately on the line 10—10 of FIG. 9;

FIG. 11 is a fragmentary transverse vertical sectional view, enlarged, taken approximately on the line 11—11 of FIG. 3; and FIG. 12 is a fragmentary longitudinal sectional view, taken approximately on the line 12—12 of FIG. 11.

Figures 1, 1A:
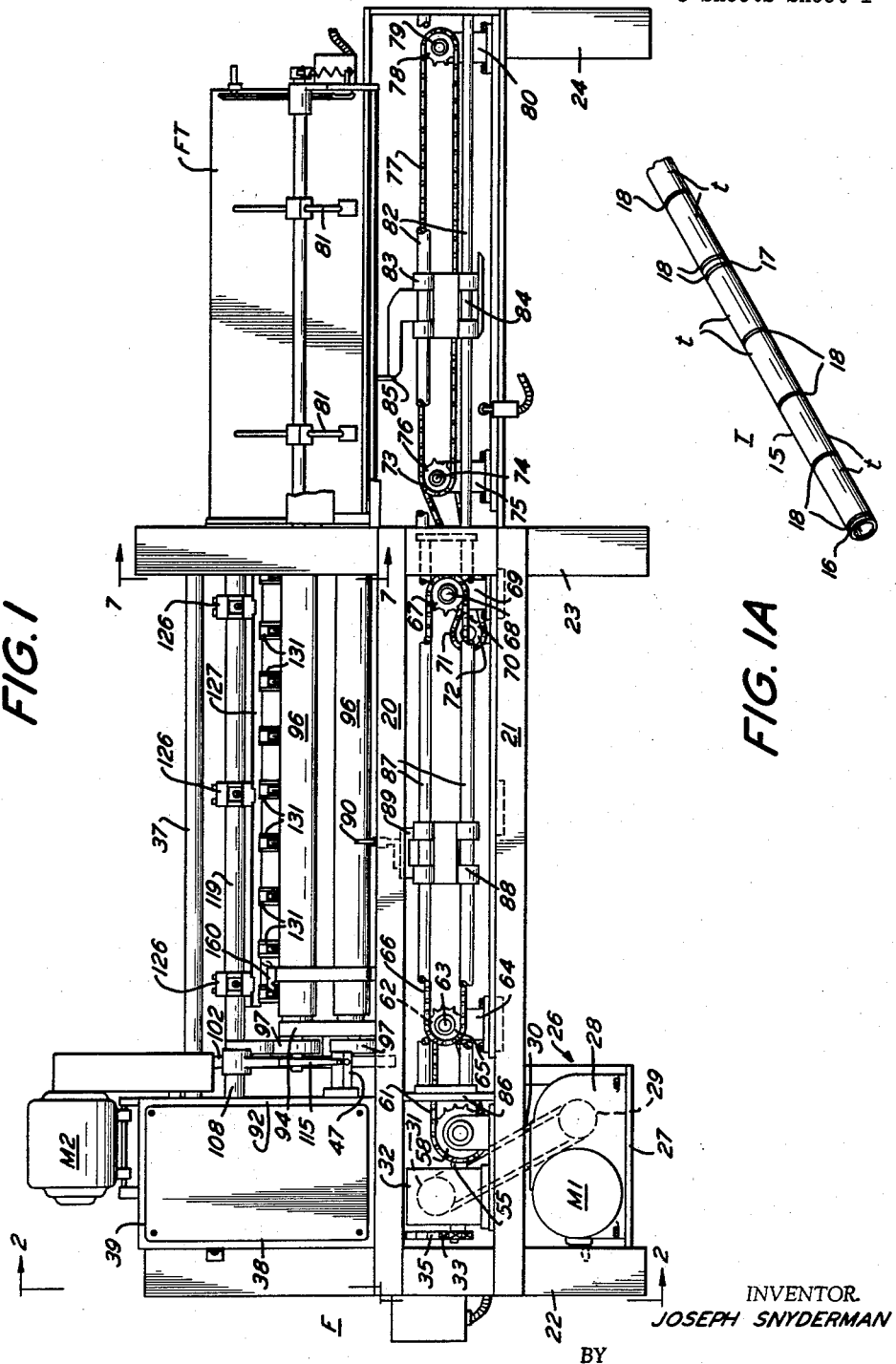
FIGURE 1 is a side elevational view of a tube recutter in accordance with the present invention.
FIG. 1A is a view in perspective of a portion of a tube to be recut on the tube recutter of the present invention.

It should, of course, be understood that the description and drawings herein are illustrative merely, and that various modifications and changes can be made in the structure disclosed without departing from the spirit of the invention.

Like numerals refer to like parts throughout the several views.

The tube recutter in accordance with the invention has a plurality of horizontal mandrels carried by a turret and advanced in a step by step relation. One of the mandrels is positioned to have a tube to be cut applied thereon, another mandrel supports the tube for advance of the knives toward it for cutting, and another mandrel has the cut or severed tubes stripped therefrom.

As the mandrel on which the tube for cutting moves to a predetermined position, the turret is locked against further movement and a support is applied at the other end of that mandrel which also positions the tube to be cut for registry as determined by a detector at the opposite end of the tube to be cut.

The cutting of the tube is effected by the cutter knives which are held by a controlled force, with accurate registry and with a minimum of waste.

Referring now to FIG. 1A of the drawings, a tube T is shown, which customarily is a spiral wound paper tube having on the exterior 15 thereof a label or cover layer upon which are printed successive repeats of the desired exterior of the container which is completed when the ends have been applied to the cut lengths $t$ of the tube T. The tube T can be a convolute tube or any other type of tube which is desired to sever to accurate lengths of shorter tubes.

At the leading end of the tube T a detector band 16 is preferably applied for detector actuation, as hereinafter explained, and intermediate the ends an accommodation band 17 may be provided, severed during the cutting, to permit of end to end accommodation of the cutter blades upon variations in length and to permit distribution either of excess length or take up for shortening, as required, while maintaining a precise length of severed tube. The cutting locations on the tube $t$ are indicated at 18.

Referring now more particularly to FIGS. 1 to 12, inclusive, of the drawings, the tube recutter includes a frame F, having horizontal longitudinal frame sections 20 and 21 and transverse vertical frame sections 22, 23 and 24.

The driving, control and cutting mechanism is mounted between the locations of the frame sections 22 and 23, the tube supplying and tube applying mechanism being mounted between the locations of the frame sections 23 and 24.

The frame section 22 has a lower housing section 26 with a lower platform 27 on which a first electric motor M1, is mounted with a variable speed reducer 28 driven thereby. The speed reducer 28, through pulleys 29 driven thereby drives belts 30 which engage pulleys 31 on the input shaft of a variable speed reducer 32. The speed reducer 32 has one output shaft 33 with a sprocket 34 thereon which through a chain 35 thereon drives a sprocket 36 on a drive shaft 37. The drive shaft 37 is journaled in a vertical frame plate 38 in an upper main housing section 39. The chain 35 is guided on idlers 40 carried by the frame plate 38.

The drive shaft 37 has a Geneva driver 41 rotatable therewith with a roller 42 engageable intermittently with a Geneva cam 43. The Geneva cam 43 is carried by a shaft 44 journaled on the frame plate 38. The Geneva cam 43 has a gear 45 driven thereby which engages with a turret drive gear 46 secured to a turret shaft 47.

The shaft 37 has secured thereto for movement therewith a turret lock cam 50 (see FIG. 5) and a knife control cam 51 (see FIG. 6), and extends to the frame section 23 where it is journaled. The shaft 37, at the frame section 23 has a mandrel support control cam 52 mounted thereon and driven thereby.

The speed reducer 32 has an additional output shaft 55 which through bevel gears 56 drives a shaft 57 having a sprocket 58 thereon. The shaft 57 also through bevel gears 59 drives a shaft 60 which extends to the other end of the frame for driving a tube feeder TF.

The sprocket 58, through a chain 61 drives a sprocket 62 on a shaft 63. The shaft 63 is journaled in a bracket 64 on the frame section 21. The shaft 63 has sprocket 65 thereon with a chain 66 carried thereon which is also carried on a sprocket 67. The sprocket 67 is mounted on a shaft 68 journaled in a bracket 69 on the frame section 21.

The shaft 68 has a sprocket 70 secured thereto with a chain 71 engaged therewith, extending over an idler 72 and engaged with a sprocket 73 on a shaft 74.

The shaft 74 is journaled in a bracket 75 carried on the frame section 21 and drives a sprocket 76 on which a tube feed chain 77 is mounted. The chain 77 is carried on a sprocket 78 mounted on a shaft 79 which is journaled in a bracket 80 on the frame section 21.

Between the frame sections 23 and 24 feed head guide rods 82 are provided which carry a horizontally reciprocable feed head carriage 83 having vertical guides for a vertically reciprocable slide 84 upon which a tube feed head 85 is secured. The slide 84 is connected to a link of the chain 77 to move it along an upper tube applying path to the left (FIG. 1) then down around the sprocket 76, then along a lower clearance path to the right, then up around the sprocket 78 for another circuit. The tube feed head 85 thus, upon movement to the left, pushes a tube to be cut onto a waiting mandrel, as hereinafter pointed out, then moves out of the way and returns to push another tube onto the next waiting mandrel in timed relation.

An inclined tube feed table FT is provided, of well known type, with reciprocable tube feeders 81 driven from the shaft 60 in timed relation.

Between a vertical frame plate 86 and the frame section 23 stripper head guide rods 87 are provided which carry a horizontally reciprocable stripper head carriage 88 having vertical guides for a vertically reciprocable slide 89 upon which a tube stripper head 90 is secured. The slide 89 is connected to a link of the chain 66 to move it in along an upper cut tube stripping path to the right (FIG. 1) then down around the sprocket 67, then along a lower clearance path to the left, then up around the sprocket 65 for another circuit. The tube stripper head 90 thus, upon movement to the right, pushes a group of cut tubes $t$ from a mandrel, as hereinafter pointed out, and then moves out of the way and returns to push another group of cut tubes as before.

The turret drive shaft 47 is journaled in a vertical frame plate 92 and has a turret head 93 keyed thereon. The head 93 has spaced turret plates 94 secured together and carrying spaced bearings 95 for the reception of horizontal mandrels 96, three being shown. Each of the mandrels 96, between the plates 94 has a mandrel driving pulley 97 thereon.

The upper main housing section 39 has a second electric motor M2 carried thereon with its output shaft 100 having a pulley 101 thereon connected by a belt 102 to a driven pulley 103 supported on a bearing 104 on a stub shaft 105. The stub shaft 105 is carried on the frame plate 92. The driven pulley 103 has secured thereto a driving pulley 106, on a bearing 107 on the stub shaft 105. The driving pulley 106 preferably has a rim 106a of rubber or other resilient material for driving engagement with one of the mandrel driving pulleys 97 which is moved into its path.

A turret lock shaft 108 carried by the frame plates 38 and 92, and has a cam follower arm 109 with a cam follower roller 110 secured thereto for engagement with the turret lock cam 50. The cam 50, as shown on FIG. 6 has a dwell portion 111 for retraction followed by a short move to engaging portion 112, then a holding dwell portion 113, followed by short disengaging portion 114, with the cycle then repeating.

The turret lock shaft 108 has a lock arm 115 adjustably secured thereto with a slidable lock pin 116, carried in a slide guide 117 on the end thereof with one of the locking openings 118 on the periphery of one of the turret plates 94. For three mandrels 96, three openings 118 are employed, one for positioning each mandrel 96.

A knife control shaft 119 is provided carried by the frame plates 38 and 92 and by the frame section 23 and has a cam follower arm 120 with a cam follower roller 121 secured thereto for engagement with a knife control cam 51. The cam 51 as shown in FIG. 7 has a retraction portion 122, followed by an advance toward cutting dwell portion 123, followed by a short advance to cutting portion 124, followed by a cutting dwell portion 125, with the cycle then repeating.

The knife control shaft 120 has a plurality of adjustable clamps 126 secured thereto with a knife mounting bar 127 held by bolts 128 extending through elongated slots 129 for adjustment. The knife mounting bar 127 has clamped thereon at the desired spaced locations by clamps 130, blade carrying frames 131. The frames 131 have pivotally mounted therein on pivot pins 132 blade carriers 133 with rotary cutter blades 134 therein on blade shafts 135. For severing the accommodation band 17, a plurality of blades 134, with their cutting edges spaced as desired, are employed. The carriers 133 are normally retracted by internal springs (not shown) in cylinders 136. The cylinders 136 have pivotal connections 137 to the carriers 133 and have fulcrums 138 on the frames 131. Air supply connections 139 to the cylinders 136 provide for resilient air cushions urging the cutter blades 134 to cutting positions, the air pressure determining the force of application. A manifold (not shown) to which the connections 139 are connected is connected to a suitable source of air under pressure having a pressure regulator 140 connected thereto.

The mandrel support control cam 52 (see FIG. 9) has a retract dwell portion 142, and a mandrel support dwell portion 143 with connecting portions 144 therebetween only one of which is shown of FIG. 9. The cam 52 has a cam follower roller 145 engaged therewith, the roller 145 being mounted on a mandrel support slide head 146 carried on slide rods 147. The slide head 146 has slidably carried thereon a mandrel engaging and supporting plug 148 which is received in a complementary opening 149 in the free end of each mandrel 96 when the same is in alignment therewith. The plug 148 is mounted on a piston rod 150 and has movable therewith a tube positioning sleeve 151. The piston rod 150 extends into an air cylinder 152 to which supply and exhaust connections 153 and 154 extend to opposite sides of a piston 155 in the cylinder 152 which actuates the piston rod 150. The connections 153 and 154 extend to a solenoid operated supply and exhaust valve mechanism 156. The valve 156 has an exhaust vent 157 to atmosphere and a supply connection 158 to the pressure regulator 140.

The valve 156 is controlled by a photoelectric or light sensitive cell 160 carried by the frame section 22 and responsible to the detector band 16 for retracting the sleeve 151 so that it does not after retraction further advance the tube T to be cut toward the opposite end of the mandrel 96. This retraction and consequent discontinuance of advance of the tube T which advance was initiated by movement of the plug 148 and sleeve 151 controls the register of the tube T to bring the cutting locations 18 of the tube T to the locations of the rotary cutter blades 134.

The slide head 146 has a cam 162 carried thereby for actuating a limit switch 163 which effects resetting of the valve 156 and return of the sleeve 151 to its advanced position ready to meet the oncoming tube T as soon as the slide head 146 is retracted.

The mode of operation will now be pointed out.

The rotation of the motor M2 is effective through the belt 102 for driving the pulley 103, and the pulley 106 through its rim 106a rotates the uppermost mandrel 96 by its engagement with the mandrel driving pulley 97. This mandrel 96 will previously have had a tube T applied thereto for cutting.

The rotation of the motor M1 is effective through the speed reducer 32 for driving the tube feeders 81 to successfully supply tubes T for cutting.

Rotation of the shaft 33 through the sprocket 34, chain 35 and sprocket 36 rotates the Geneva driver 41 to bring the roller 42 into engagement with the Geneva cam 43. The cam 43 by its intermittent engagement by the roller 42 advances the shaft 44 step by step, the gear 45 driving the gear 46 to actuate the turret drive shaft 47 so that one mandrel 96 is in an upward position for rotation and for engagement of the cutter blades 134, and two mandrels 96 are in lower positions. One of the lower mandrels 96 has a tube T supplied from the feed table FT pushed thereon by movement towards the left (FIG. 1) of the tube feeder head 85. The other of the lower mandrels 96 has the previously cut tubes *t* stripped therefrom by movement towards the right (FIG. 1) of the tube stripper head 90.

As previously indicated the tube feeder head 85 and the tube stripper head 90, in their return movements are lowered to out of engagement paths of travel.

As the turret drive shaft 47 moves a mandrel 96 with a tube T thereon to its upward position three events occur. The turret lock cam 50 which had previously effected retraction of the lock pin 116 from the opening 118 in which it had been engaged so that the turret head 93 was free for rotation, now moves the pin 116 into locking position to positively hold the turret head 93, and the mandrels 96 mounted thereon against rotary displacement to permit tube feeding, cut tube stripping and cutting.

As the turret head 93 is locked the mandrel support control cam 51 advances the slide head 146 to bring the mandrel plug 148 into the end opening 149 of the uppermost mandrel 96. The tube positioning sleeve 151 is advanced with the plug 148 and engages the trailing end of the tube T and pushes the tube T. As soon as the detector band 16 moves into the line of sight of the photosensitive cell 160 the valve 156 is actuated to supply air under pressure to retract the piston 155. Retraction of the piston 155 moves the sleeve 151 away from the tube T so that the position to which it has been advanced is determined, this providing the desired register for cutting. This retraction of the sleeve 151 while sufficient to avoid further advance of the tube T on the mandrel 96 does not move the plug 148 to an extent to remove the support given the free end of the mandrel 96.

After the tube T has thus been registered the knife control cam 51 causes the blade mounting bar 127 to advance the blade carrying frames 131 and the blade carriers 133 therein so that the blades 134 engage the tube T at the cutting locations 18. The blades 134 are resiliently urged into cutting engagement with the tube T by the air cushioning action of the cylinders 136. Upon completion of the time permitted for cutting the cutter blades are retracted by the action of the cam 51. The slide head 146 is retracted to permit movement of the upper mandrel 96 downwardly to stripping position and the cam 162 through the switch 163 signals the valve 156 to reset the sleeve to its advanced position.

The turret lock cam 50 will release the locking pin 116 so that the turret head 93 can be rotated by the action of the Geneva driver 41 and its cam 42.

The continuous step by step supplying, cutting and stripping is repeated in rapid sequence, and with registry of the tube T for accurate cutting.

The advance of the mandrel support plug 148, and tube positioning sleeve 151 with the greater motion imparted by the cam 52 and with control and retraction by the piston 155 has been found to be rapid and effective.

I claim:

1. In a tube cutting machine having a mandrel rotatably supported at one end, members for feeding a tube to be cut onto the mandrel from the other end thereof at one location, members for advancing the mandrel to another location for tube cutting, and to another location for stripping, the improvement which comprises means including a slidable member for advancing a mandrel support for said other end into engagement with the mandrel and a tube positioning member for moving said tube longitudinally on said mandrel, said means for advancing including an actuator member movable in timed relation to said members for feeding a tube, detector means responsive to the initial position of said tube for controlling said tube positioning member, and members for rotating said mandrel at the location for tube cutting.

2. A tube cutting machine as defined in claim 1 in which said actuating member has a cam for determining at least part of the advancing movement and a fluid pressure operated member for controlling the movement of the positioning member.

3. A tube cutting machine as defined in claim 2 in which said detector means effects retraction of the fluid pressure operated member.

4. A tube cutting machine as defined in claim 1 having positive locking means for retaining the mandrel at at least one of said locations.

5. A tube cutting machine as defined in claim 4 in which the locking means is operated by the advancing members.

6. A tube cutting machine as defined in claim 4 having cutter members and members for advancing said cutter members into cutting engagement after locking operation of said locking means.

7. In a tube cutting machine having a rotatable turret head, members for moving said turret head through a partial rotation in timed relation, members for positively locking said turret head at selected positions, a rotatable mandrel carried at one end by said turret head, members for advancing a tube to be cut onto said mandrel in timed relation to the movement of said turret head, members for rotating said mandrel with said turret head in locked position, members for supporting the other end of said mandrel with said turret head in locked position, and members for advancing cutter blades into cutting engagement with a tube on said mandrel with said turret head in locked position, said supporting members having controlling devices advancing and retracting the members for supporting in timed relation prior to and subsequent to the movement of said cutting blades to cutting engagement.

8. A tube cutting machine as defined in claim 7 in which a drive shaft is provided having cam members for controlling said turret head locking members, said mandrel end supporting members and said cutter blade advancing members.

9. A tube cutting machine as defined in claim 8 in which an additional intermittent cam is connected to said shaft for operating said turret head moving members.

10. A tube cutting machine as defined in claim 7 in which said turret head has an additional mandrel, and said members for advancing a tube have operating portions for feeding a tube to be cut onto said additional mandrel during the tube cutting on the first mandrel.

11. A tube cutting machine as defined in claim 7 in which said turret head has an additional mandrel, and members are provided for stripping cut tubes previously cut with said mandrel at said locked position from said additional mandrel during tube cutting on the first mandrel.

12. A tube cutting machine as defined in claim 7 in which said turret head has at least two additional mandrels, said members for advancing a tube to be cut have portions for feeding a tube onto one of said additional mandrels during the tube cutting operation on the first mandrel, and members are provided for stripping previously severed tubes from another of said additional mandrels during the tube cutting on the first mandrel.

13. A tube cutting machine as defined in claim 7 having a tube position detecting member responsive to the position of a tube on said mandrel and a tube positioning member controlled by said detecting member.

14. A tube cutting machine as defined in claim 13 in which said tube positioning member is movable with said mandrel end supporting members.

15. A tube cutting machine as defined in claim 7 in which said members for supporting the other end of said mandrel include a slidable head having a portion for supporting engagement with said mandrel.

16. A tube cutting machine as defined in claim 15 in which said slidable head has another portion for tube positioning engagement.

17. A tube cutting machine as defined in claim 16 in which at least said other portion has an additional positioning member.

18. A tube cutting machine as defined in claim 7 in which said members for supporting the other end of the mandrel have a portion movable therewith for tube positioning engagement, and said portion has an additional positioning member.

19. A tube cutting machine as defined in claim 18 in which resetting means is provided for said additional positioning member controlled by the positioning of said members for supporting the other end of the mandrel.

References Cited by the Examiner
UNITED STATES PATENTS

| | | | |
|---|---|---|---|
| 1,345,458 | 7/20 | Pierce | 82—101 X |
| 2,114,272 | 4/38 | Temple | 82—99 X |
| 2,398,929 | 4/46 | Forsberg | 82—81 |
| 2,785,750 | 3/57 | Hohl. | |

WILLIAM W. DYER, JR., *Primary Examiner.*

LEON PEAR, *Examiner.*